United States Patent [19]

Heinz

[11] Patent Number: 4,923,176

[45] Date of Patent: May 8, 1990

[54] FENCE ANGULAR CONNECTOR ASSEMBLY

[75] Inventor: Donald E. Heinz, West Olive, Mich.

[73] Assignee: Harbor Towne Fence, Inc., Grand Haven, Mich.

[21] Appl. No.: 292,455

[22] Filed: Dec. 30, 1988

Related U.S. Application Data

[63] Continuation-in-part of Ser. No. 149,691, Feb. 28, 1988, and Ser. No. 233,830, Aug. 19, 1988.

[51] Int. Cl.$^5$ ................................................ I16B 7/08
[52] U.S. Cl. ...................................... 256/65; 256/21; 403/191
[58] Field of Search .................. 256/65, 67, 68, 69, 256/59, 22, 21, 26, 72; 403/178, 174, 169, 191, 245, 246, 262, 64, 65, 116, 231

[56] References Cited

U.S. PATENT DOCUMENTS

| | | |
|---|---|---|
| 101,825 | 4/1870 | Clinger . |
| 437,592 | 9/1890 | Goetz . |
| 444,681 | 1/1891 | Windus . |
| 716,898 | 12/1902 | Hutchings . |
| 725,527 | 4/1903 | Whitehurst . |
| 949,394 | 2/1910 | Daly . |
| 1,791,680 | 2/1931 | Miller . |
| 2,037,736 | 4/1936 | Payne et al. . |
| 2,113,196 | 4/1938 | Jones . |
| 2,118,467 | 5/1938 | Jones . |
| 2,576,427 | 11/1951 | Tomb ..................................... 256/21 |
| 2,715,513 | 8/1955 | Kools ..................................... 256/21 |
| 2,944,797 | 7/1960 | Magness .............................. 256/21 |
| 3,031,217 | 4/1962 | Tinnerman . |
| 3,136,530 | 6/1964 | Case ....................................... 256/24 |
| 3,195,937 | 7/1965 | Case . |
| 3,304,683 | 2/1967 | Ferreira . |
| 3,343,811 | 9/1967 | Kusel et al. ........................... 256/22 |
| 3,471,182 | 1/1968 | Schroer . |
| 3,499,631 | 3/1970 | Heldenbrand ..................... 256/59 X |
| 3,752,262 | 8/1973 | Helms . |
| 3,942,763 | 3/1976 | Helterbrand et al. ............... 256/22 |
| 3,946,992 | 3/1976 | Elias ..................................... 256/68 |
| 3,960,367 | 6/1976 | Rogers ............................. 256/65 X |
| 3,993,289 | 11/1976 | Lewis et al. .......................... 256/59 |
| 4,073,478 | 2/1978 | Bermudez . |
| 4,074,893 | 2/1978 | Coltrin ................................... 256/21 |
| 4,101,226 | 7/1978 | Parisien . |
| 4,150,907 | 4/1979 | Thurnauer ...................... 403/191 X |
| 4,421,302 | 12/1983 | Grimm et al. ................... 256/65 X |
| 4,599,010 | 7/1986 | Hocking ............................. 403/191 |
| 4,600,179 | 7/1986 | Willetts ................................. 256/67 |
| 4,623,126 | 11/1986 | Pettit ..................................... 256/25 |
| 4,723,760 | 2/1988 | O'Sullivan ............................ 256/65 |

FOREIGN PATENT DOCUMENTS

| | | |
|---|---|---|
| 3404947 | 8/1985 | Fed. Rep. of Germany . |
| 572556 | 2/1976 | Switzerland ......................... 256/67 |

Primary Examiner—Randolph A. Reese
Assistant Examiner—Peter M. Cuomo
Attorney, Agent, or Firm—Price, Heneveld, Cooper, DeWitt & Litton

[57] ABSTRACT

A fence connector assembly is provided with a connector bracket defining a vertical cavity for receiving a fence post, in which vertically oriented, laterally extending side members project from the side of the bracket parallel to each other and spaced apart. A swivel bracket having a pair of spaced legs connected by a convex bearing portion, engages the side members so that the legs form a rail receiving pocket therebetween. The bearing portion has a horizontally elongated slot. The lock fastener extends through the slot into threaded engagement with the connector bracket enabling the swivel bracket to be swivelable to selected positions to allow selected orientation of a rail relative to the connector bracket and a post therein.

8 Claims, 1 Drawing Sheet

U.S. Patent
May 8, 1990
4,923,176
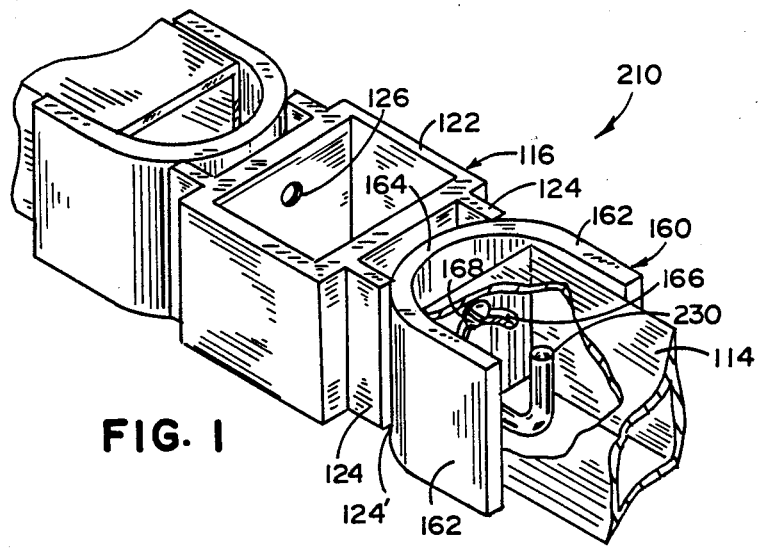
FIG. 1
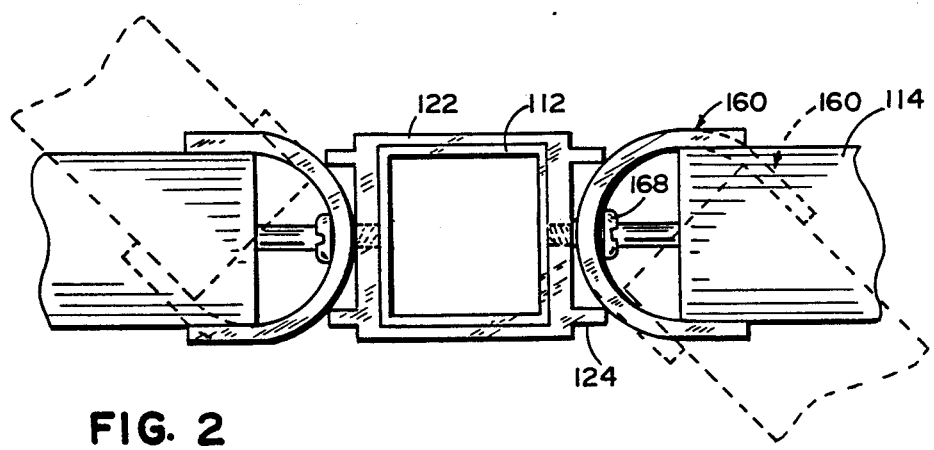
FIG. 2
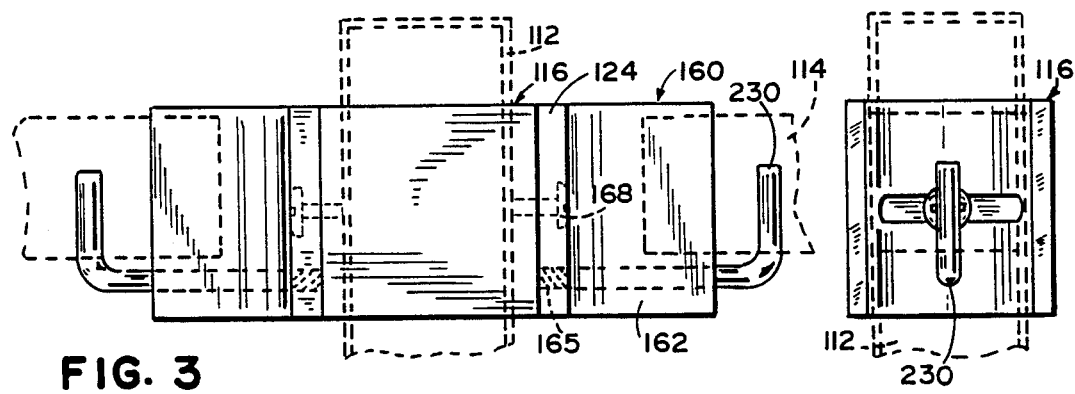
FIG. 3
FIG. 4

FENCE ANGULAR CONNECTOR ASSEMBLY

This application is a continuation-in-part of applications Ser. No. 149,691, filed 1/28/88 and Ser. No. 233,830, filed 8/19/88.

BACKGROUND OF THE INVENTION

This invention relates to fencing, and more particularly to a fence connector assembly for connecting fence rails to fence posts.

One common technique for mounting metal fencing is to anchor sockets to the ground, insert posts into the sockets, and place caps on the tops of the posts. Rails are then mounted between and to the posts. Typically, the formation of a fence requires labor intensive assembly as well as the use of multiple tools. Connection of the rails to the posts is tedious and time consuming, as is the interconnection of successive vertical rungs between the rails. Moreover, construction on uneven terrain is particularly complex, often requiring a customized structure and special skills.

In the copending applications identified below, novel fence assembly components are set forth which enable fencing to be easily and quickly assembled on site with minimum skill. Such apparatus moreover allows the fence rails to be at various vertical angles, thereby readily accommodating uneven terrain and conditions.

In making installations of such fencing, it has sometimes been found desirable to be able to extend the rails from the posts at unusual horizontal angles rather than the normal 90 degrees, 180 degrees or 270 degrees typically encountered. Therefore, it was realized that a variable connector assembly allowing selected horizontal angles would be particularly advantageous.

SUMMARY OF THE INVENTION

The present invention provides a fence assembly which not only facilitates quick and easy interconnection of the rails to the fence posts and accommodates uneven terrain, but also enables the rails to be placed at a desired horizontal angle relative to the posts.

The present invention employs a unique connector assembly between rails and posts of a fence. A connector bracket cooperates with a swivel bracket to enable rails to be selectively positioned in a particular horizontal orientation over a large angle of selection. A swivel bracket having a swivel interfit with a pair of spaced flanges on a slide bracket forms cooperative bearing surfaces therebetween.

The connector bracket includes the sleeve and its pair of flanges on each side and, cooperative therewith, a U-shaped swivel bracket having a convex bearing surface engaging the outer edges of these flanges, to swivel horizontally relative thereto. The legs of the swivel bracket receive the end of a rail. An L-shaped stud mounts in this swivel bracket to engage the rail. The swivel bracket is lockable into a particular swiveled position by a fastener extending through an elongated horizontal slot in the swivel bracket and threadably engaging the connector bracket.

The novel assembly allows easy rapid assembly with a widely variable selection of rail angles on respective sides of the vertical mounting posts.

The novel assembly has proven that fencing can be erected in a small fraction of the time previously required, using even unskilled labor, can accommodate uneven terrain, with the components being readily mass producible at moderate cost, but also can be placed in unusual geometric patterns.

These and other objects, advantages and features of the invention will become apparent upon studying the following specification in conjunction with the drawings.

BRIEF DESCRIPTION OF THE DRAWINGS

FIG. 1 is a fragmentary, perspective view of a fence connector assembly (without the post) according to this invention;

FIG. 2 is a plan view of the fence connector assembly in FIG. 1, including the post;

FIG. 3 is a side elevational view of the connector assembly; and

FIG. 4 is an end elevational view thereof.

DESCRIPTION OF THE PREFERRED EMBODIMENT

Referring now specifically to the drawings, the subassembly 210 there depicted is shown to include a connector bracket 116 having a vertical sleeve 122 defining a vertical cavity therein for receiving a fence post 112 (FIG. 2). On at least one side, and here shown to be two sides, of sleeve 122 is a side mount formed by a pair of laterally spaced, vertically oriented and extending side members or flanges 124 projecting basically parallel to each other and having outer bearing edges 124'. Between these two flanges 124 is a threaded socket or orifice 126 in sleeve 122 for receiving a threaded fastener to be described.

Although the illustrated embodiment of the apparatus shows two pair of flanges 124 at opposite sides of the connector bracket, the flanges could alternatively be on one side, on three sides, or on all sides, as desired for a particular installation.

Cooperative with each pair of flanges forming a side mount is a swivel bracket 160 shown to be U-shaped. Each swivel bracket has a pair of spaced legs 162 integrally connected by a convex curvilinear bearing portion 164. These legs are parallel to each other and form a rail receiving pocket therebetween. The bearing portion 164 engages the bearing edges 124' of flanges 124 so that the swivel bracket can be laterally pivotally shifted, i.e. is swivelable, to selected horizontal orientations relative to mounting flanges 124 and the respective side of connector bracket 116. One alternate angular orientation, for example, is depicted in phantom lines in FIG. 2. Conceivably the curvilinear configuration of the bearing portion could be convex and multifaceted. Likewise, the pair of flanges 124 could be part of a concave pocket to receive convex portion 164 of swivel bracket 160.

Extending through the convex portion 164 is horizontally elongated orifice means 166 preferably in the form of a horizontally elongated slot. A threaded fastener 168 serving as a lock bolt and connector extends through slot 166 into threaded engagement with orifice 126. If fastener 168 is loosened slightly, swivel connector 160 may be horizontally pivoted to a desired location for orienting the swivel bracket and a rail mounted therein to a desired horizontal angular orientation relative to the post and the remaining portions of the fence structure. When fastener 168 is tightened, it locks the curvilinear convex portion 164 and thus swivel bracket 160 into tight engagement with the side mount formed by mounting flanges 124, to secure the components in fixed relationship to each other.

An L-shaped mounting stud 230 is threadably engaged with a threaded orifice 165 in convex portion 164 (FIG. 3) toward the lower part of swivel bracket 160. Thus, stud 230 extends laterally intermediate the two parallel legs 162, and has a vertical distal end to interfit into an orifice in the bottom of a fence rail 114 fitted down into the pocket between legs 162. A connector clip such as those shown in the above noted prior applications interengages with this distal end within rail 114 to retain the rail on the stud. In the embodiment depicted, rails extend from two opposite sides of connector bracket 116.

In assembling the novel fence, therefore, the assembly steps described in the prior applications are followed with additional steps to enable rails 114 to be oriented at desired horizontal angular orientations relative to the posts and connector bracket 116, as shown for example in FIGS. 1 and 2 herein. Thus, during assembly, swivel bracket 160 is fastened by threaded fastener 168 to sleeve 122 of connector bracket 116, and swiveled to the desired angular orientation, after which fastener 168 is preferably tightened to lock the swivel bracket in this selected position. Thereafter, the L-shaped stud 230 can be threadably connected to the swivel bracket, and the end of rail 114 lowered onto the stud for engagement therewith.

It is conceivable that other variations than those described herein may be made in the preferred embodiment which is depicted, without departing from the scope of the inventive concept presented. Hence, the invention is not intended to be limited to the depicted illustrative embodiment, but only by the scope of the appended claims and the reasonably equivalent structures to those defined therein.

The embodiments of the invention in which an exclusive property or privilege is claimed are defined as follows.

1. A fence connector assembly comprising:
   a connector bracket having a vertical sleeve defining a vertical cavity for receiving a fence post;
   at least one pair of vertically oriented, laterally extending side members projecting from at least one side of said sleeve, said members being substantially parallel to each other and spaced apart, and having vertical outer bearing edges;
   a threaded orifice in said sleeve between said side members;
   a swivel bracket having a pair of spaced vertical legs integrally connected by a horizontally convex curvilinear bearing portion, said legs forming a rail receiving pocket therebetween, and said bearing portion having a horizontally elongated slot;
   a fastener extending through said slot into threaded engagement with said orifice, and said swivel bracket bearing portion abutting said outer bearing edges, whereby said swivel bracket is swivelable to selected positions on said bearing edges to allow selected horizontal orientation of said swivel bracket and a rail relative to said connector bracket and a post therein.

2. The fence connector assembly in claim 1 including:
   a threaded orifice in said bearing portion and
   an L-shaped stud having one leg threadably engageable with said orifice in said bearing portion and extending out between said legs, said stud having a vertical distal leg to engage a rail positioned between said legs.

3. The fence connector assembly in claim 2 including:
   a fence rail having one end between said swivel bracket legs, and having a bottom with an orifice therein to receive said stud distal end.

4. A fence connector assembly comprising:
   a connector bracket having a vertical sleeve defining a vertical cavity for receiving a fence post;
   at least one laterally extending side mount projecting from at least one side of said sleeve;
   a swivel bracket having a pair of spaced legs integrally connected by a convex portion, said legs forming a rail receiving pocket therebetween, and said convex portion having horizontally elongated orifice means for receiving a fastener;
   a fastener extending through said orifice means to said sleeve whereby said swivel bracket is shiftable to selected positions on said side mount to allow selected orientation of a rail relative to said connector bracket and a post therein; and
   a stud extending out from said convex portion between said legs, said stud engageable with a rail positioned between said legs.

5. The fence connector assembly in claim 4 wherein said fastener is threadably engaged with said sleeve to enable the swivel bracket to shift when said fastener is not tightened and said swivel bracket to be locked to said sleeve when said fastener is tightened.

6. The fence connector assembly in claim 5 wherein said convex portion is curvilinear.

7. The fence connector assembly in claim 6 wherein said orifice means is an elongated slot.

8. The fence connector assembly in claim 4 wherein said sleeve has a plurality of sides and has at least two laterally extending side mounts with a swivel bracket for each.

* * * * *